(12) United States Patent
Hooper

(10) Patent No.: US 12,733,627 B1
(45) Date of Patent: Sep. 15, 2026

(54) COLLAPSIBLE RAMP

(71) Applicant: Eliana Hooper, Chicago, IL (US)

(72) Inventor: Eliana Hooper, Chicago, IL (US)

( * ) Notice: Subject to any disclaimer, the term of this patent is extended or adjusted under 35 U.S.C. 154(b) by 0 days.

(21) Appl. No.: 19/079,191

(22) Filed: Mar. 13, 2025

(51) Int. Cl.
*A01K 15/02* (2006.01)

(52) U.S. Cl.
CPC .................................. *A01K 15/027* (2013.01)

(58) Field of Classification Search
CPC .............................. A01K 15/027; A01K 1/035
USPC ......................... 119/706, 703, 705, 847, 849
See application file for complete search history.

(56) References Cited

U.S. PATENT DOCUMENTS 2,620,185 A * 12/1952 Harding ................. A63G 21/00 D21/818
3,159,141 A * 12/1964 Paterek ................ A01K 15/024 482/142
3,173,398 A * 3/1965 Raymond .............. A01K 1/035 119/28.5
4,265,199 A * 5/1981 Hopkins .............. A01K 1/0029 119/908
4,369,965 A * 1/1983 Ahrens .................... A63B 9/00 D21/818
5,634,440 A * 6/1997 Mogck ................... A01K 1/035 119/706
6,009,587 A 1/2000 Beeman
6,412,440 B2 7/2002 Kobayashi
6,598,562 B1 * 7/2003 Dutkiewicz ............... E06C 1/39 119/706
6,860,238 B1 * 3/2005 Foresman ............... E01F 5/005 119/485
7,011,036 B1 * 3/2006 Hill ......................... B63B 27/14 114/362
7,043,789 B2 5/2006 Morrish
7,082,637 B1 8/2006 Griffin
7,222,838 B1 * 5/2007 Ji ............................ B66F 7/243 254/88
7,493,874 B2 * 2/2009 Simpson .............. A01K 1/0272 119/849
7,735,457 B2 * 6/2010 O'Connor ............... E04H 4/144 119/753
8,899,188 B1 12/2014 Douglas et al.
8,979,418 B2 3/2015 Whiteley
9,832,968 B2 12/2017 Jakubowski et al.
10,492,471 B2 * 12/2019 Sarver .................. A01K 15/027

(Continued)

FOREIGN PATENT DOCUMENTS

DE 202016002858 U1 8/2016
EP 1494890 B1 8/2007

*Primary Examiner* — Maria E Graber
(74) *Attorney, Agent, or Firm* — Thompson Coburn LLP

(57) ABSTRACT

A collapsible ramp is disclosed that may contain a bridge, a first ramp, a second ramp, and a plurality of side walls. The first and second ramps are operatively connected to the bridge. The plurality of side walls are operatively connected to the bridge, the first ramp and the second ramp. The first and second ramps can be moved from a first, collapsed position to a second, extended position. The plurality of side walls can similarly be moved from a first, collapsed position to a second, extended position. The bridge may contain a first leg and a second leg. The first and second leg may also be moved from a first, collapsed position to a second, extended position. The collapsible ramp may further contain a gripping material coupled to the bridge, the first ramp, and the second ramp.

14 Claims, 9 Drawing Sheets

(56) References Cited

U.S. PATENT DOCUMENTS

| | | | | |
|---|---|---|---|---|
| 10,524,969 | B2 * | 1/2020 | Ishikawa | A61G 3/061 |
| 10,869,456 | B2 | 12/2020 | Cheung | |
| D910,938 | S * | 2/2021 | Jakubowski | D30/199 |
| D911,637 | S * | 2/2021 | Jakubowski | D30/199 |
| 11,585,096 | B2 * | 2/2023 | Jakubowski | E04F 11/002 |
| 11,930,790 | B1 * | 3/2024 | Fang | A01K 1/035 |
| 2017/0231197 | A1 * | 8/2017 | Sarver | A01K 15/027 119/706 |
| 2017/0340493 | A1 * | 11/2017 | Sidhu | B60P 1/435 |
| 2017/0341560 | A1 * | 11/2017 | Stojkovic | B60P 1/435 |
| 2018/0221224 | A1 * | 8/2018 | Smith | A61G 3/061 |
| 2020/0037582 | A1 * | 2/2020 | Caterson | A01K 29/00 |
| 2020/0128784 | A1 | 4/2020 | Longo | |
| 2024/0044143 | A1 | 2/2024 | Prenosil | |
| 2024/0237609 | A1 * | 7/2024 | Thompson | A01K 1/0272 |

* cited by examiner

COLLAPSIBLE RAMP

BACKGROUND OF THE INVENTION

The present disclosure generally relates to the field of collapsible ramps. More particularly, the present disclosure relates to a collapsible ramp designed to provide a pet with exercise.

Pets need regular exercise to maintain their health. Pet owners may have limited time and resources to provide opportunities for the pet to receive enough exercise to adequately maintain its health. Thus, many pet owners buy toys and devices that encourage the pet to exercise.

One such toy/device is a ramp that allows the pet to travel up and down the ramp. Such ramps can be bulky and difficult to store and move from one location to another. The inventor, recognizing these existing issues, has developed a solution that provides an exercise ramp that can be easily stored and moved.

Further features and advantages of the disclosed embodiments, as well as the structure and operation of various elements of the disclosed embodiments, are described in detail below with reference to the accompanying drawings.

SUMMARY OF THE INVENTION

In view of the above, a collapsible ramp and method of use is provided. The collapsible ramp having a bridge, a first bridge side wall operatively connected to the bridge, a second bridge side wall operatively connected to the bridge, a first ramp operatively connected to the bridge, a first ramp side wall operatively connected to the first ramp, a second ramp side wall operatively connected to the first ramp, a second ramp operatively connected to the bridge, a third ramp side wall operatively connected to the second ramp, a fourth ramp side wall operatively connected to the second ramp, wherein the first bridge side wall is movable between a first position and a second position, wherein the second bridge side wall is movable between a first position and a second position, wherein the first ramp side wall is movable between a first position and a second position, wherein the second ramp side wall is movable between a first position and a second position, wherein the third ramp side wall is movable between a first position and a second position, and wherein the fourth ramp side wall is movable between a first position and a second position.

The collapsible ramp wherein the first ramp is movable between a first position and a second position, and wherein the second ramp is movable between a first position and a second position.

The collapsible ramp further having a first gripping material coupled to the first ramp, a second gripping material coupled to the second ramp, a third gripping material coupled to the bridge.

The collapsible ramp wherein the first gripping material has a plurality of openings, wherein the second gripping material has a plurality of openings, and wherein the third gripping material has a plurality of openings.

The collapsible ramp wherein the first gripping material has a higher frictional coefficient when contacting an object using the collapsible ramp than the first ramp, wherein the second gripping material has a higher frictional coefficient when contacting the object using the collapsible ramp than the second ramp, and wherein the third gripping material has a higher frictional coefficient when contacting the object using the collapsible ramp than the bridge.

The collapsible ramp wherein the bridge has a first leg and a second leg.

The collapsible ramp further having an opening under the bridge and between the first leg of the bridge and the second leg of the bridge.

The collapsible ramp further having a plurality of latches, and wherein the plurality of latches are operatively connected to the bridge, the first ramp, and the second ramp.

The collapsible ramp wherein the first bridge side wall latches into the second position, wherein the second bridge side wall latches into the second position, wherein the first ramp side wall latches into the second position, wherein the second ramp side wall latches into the second position, wherein the third ramp side wall latches into the second position, and wherein the fourth ramp side wall latches into the second position.

The collapsible ramp wherein the first ramp is angled between 0 and 45 degrees below a horizontal plane.

A collapsible ramp having a bridge having a first leg and a second leg, a first ramp operatively connected to the bridge, a second ramp operatively connected to the bridge, wherein the first leg is movable between a first position and a second position, wherein the second leg is movable between a first position and a second position, wherein the first ramp is movable between a first position and a second position, and wherein the second ramp is movable between a first position and a second position.

The collapsible ramp further having a first bridge side wall operatively connected to the bridge, a second bridge side wall operatively connected to the bridge, a first ramp side wall operatively connected to the first ramp, a second ramp side wall operatively connected to the first ramp, a third ramp side wall operatively connected to the second ramp, a fourth ramp side wall operatively connected to the second ramp, wherein the first bridge side wall is movable between a first position and a second position, wherein the second bridge side wall is movable between a first position and a second position, wherein the first ramp side wall is movable between a first position and a second position, wherein the second ramp side wall is movable between a first position and a second position, wherein the third ramp side wall is movable between a first position and a second position, and wherein the fourth ramp side wall is movable between a first position and a second position.

The collapsible ramp further having a first gripping material coupled to the first ramp, a second gripping material coupled to the second ramp, a third gripping material coupled to the bridge.

The collapsible ramp wherein the first gripping material has a plurality of openings, wherein the second gripping material has a plurality of openings, and wherein the third gripping material has a plurality of openings.

The collapsible ramp wherein the first gripping material has a higher frictional coefficient when contacting an object using the collapsible ramp than the first ramp, wherein the second gripping material has a higher frictional coefficient when contacting the object using the collapsible ramp than the second ramp, and wherein the third gripping material has a higher frictional coefficient when contacting the object using the collapsible ramp than the bridge.

The collapsible ramp further having a plurality of latches, and wherein the plurality of latches are operatively connected to the bridge, the first ramp, and the second ramp.

The collapsible ramp wherein the first bridge side wall latches into the second position, wherein the second bridge side wall latches into the second position, wherein the first ramp side wall latches into the second position, wherein the second ramp side wall latches into the second position, wherein the third ramp side wall latches into the second position, and wherein the fourth ramp side wall latches into the second position.

A method of exercising a pet including placing a bridge in front of the pet, moving a first ramp operatively connected to the bridge from a first position to a second position, moving a second ramp operatively connected to the bridge from a first position to a second position, moving a first bridge side wall operatively connected to the bridge from a first position to a second position, moving a second bridge side wall operatively connected to the bridge from a first position to a second position, moving a first ramp side wall operatively connected to the first ramp from a first position to a second position, moving a second ramp side wall operatively connected to the first ramp from a first position to a second position, moving a third ramp side wall operatively connected to the second ramp from a first position to a second position, moving a fourth ramp side wall operatively connected to the second ramp from a first position to a second position, placing the pet on the first ramp; and wherein the pet traverses the first ramp, the second ramp, and the bridge.

The method wherein the pet further traverses an opening under the bridge and between a first leg of the bridge and a second leg of the bridge.

The method wherein the moving the first bridge side wall step further includes latching the first bridge side wall in the second position, wherein the moving the second bridge side wall step further includes latching the second bridge side wall in the second position, wherein the moving the first ramp side wall step further includes latching the first ramp side wall in the second position, wherein the moving the second ramp side wall step further includes latching the second ramp side wall in the second position, wherein the moving the third ramp side wall step further includes latching the third ramp side wall in the second position, wherein the moving the fourth ramp side wall step further includes latching the fourth ramp side wall in the second position.

BRIEF DESCRIPTION OF THE DRAWINGS

The accompanying drawings, which are incorporated in and form a part of the specification, illustrate the disclosed embodiments and, together with the description, serve to explain certain inventive principles. In the drawings.

DETAILED DESCRIPTION OF EXAMPLE EMBODIMENTS

The foregoing and other features and advantages of the invention will become more apparent from the following detailed description of exemplary embodiments, read in conjunction with the accompanying drawings. The detailed description and drawings are merely illustrative of the present disclosure rather than limiting, the scope of the invention being defined by the appended claims and equivalents thereof.

Figure 1:
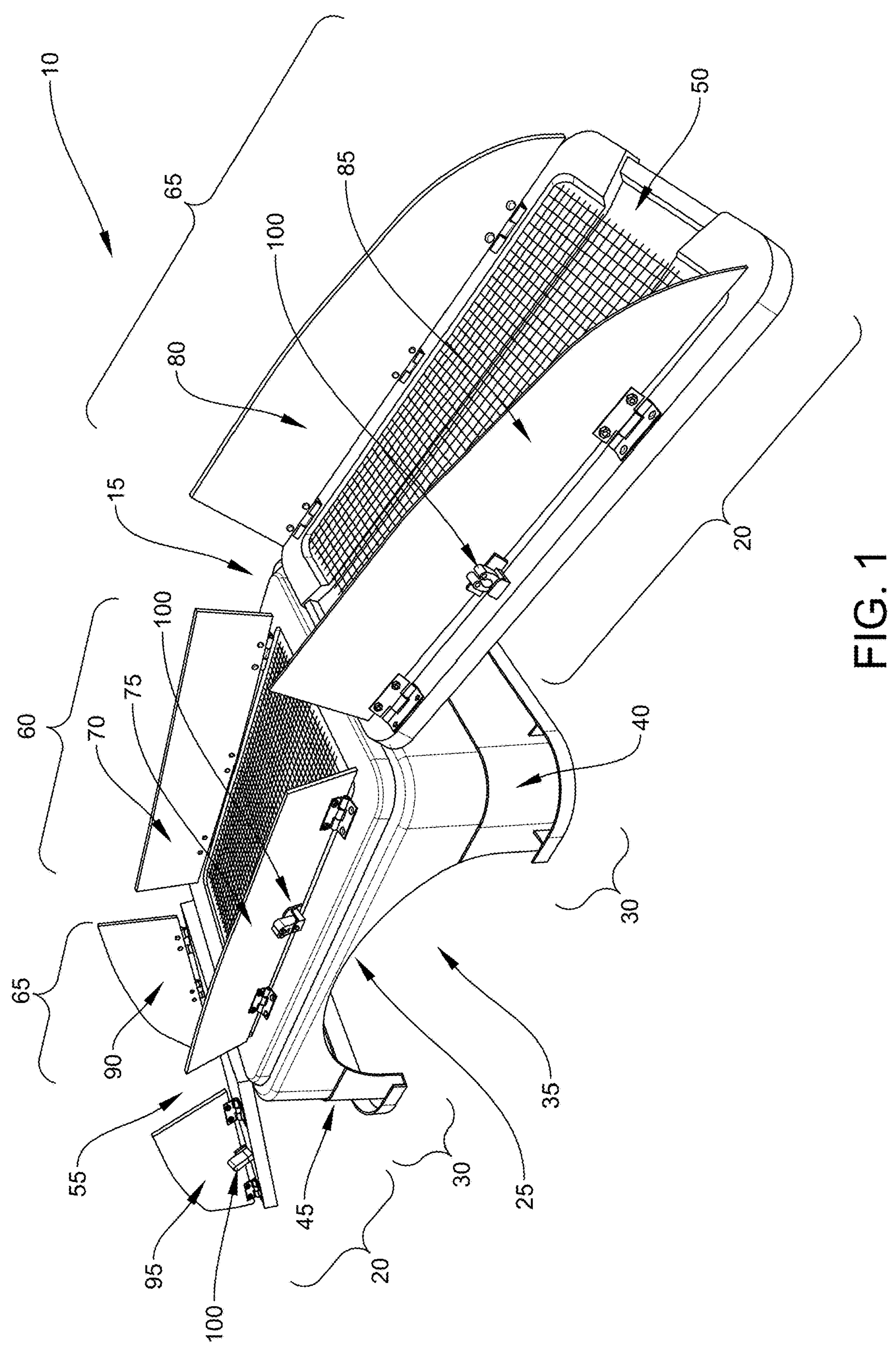
FIG. 1 shows a perspective view of an example collapsible ramp in its extended state in accordance with an embodiment of the disclosure.
Figure 2:
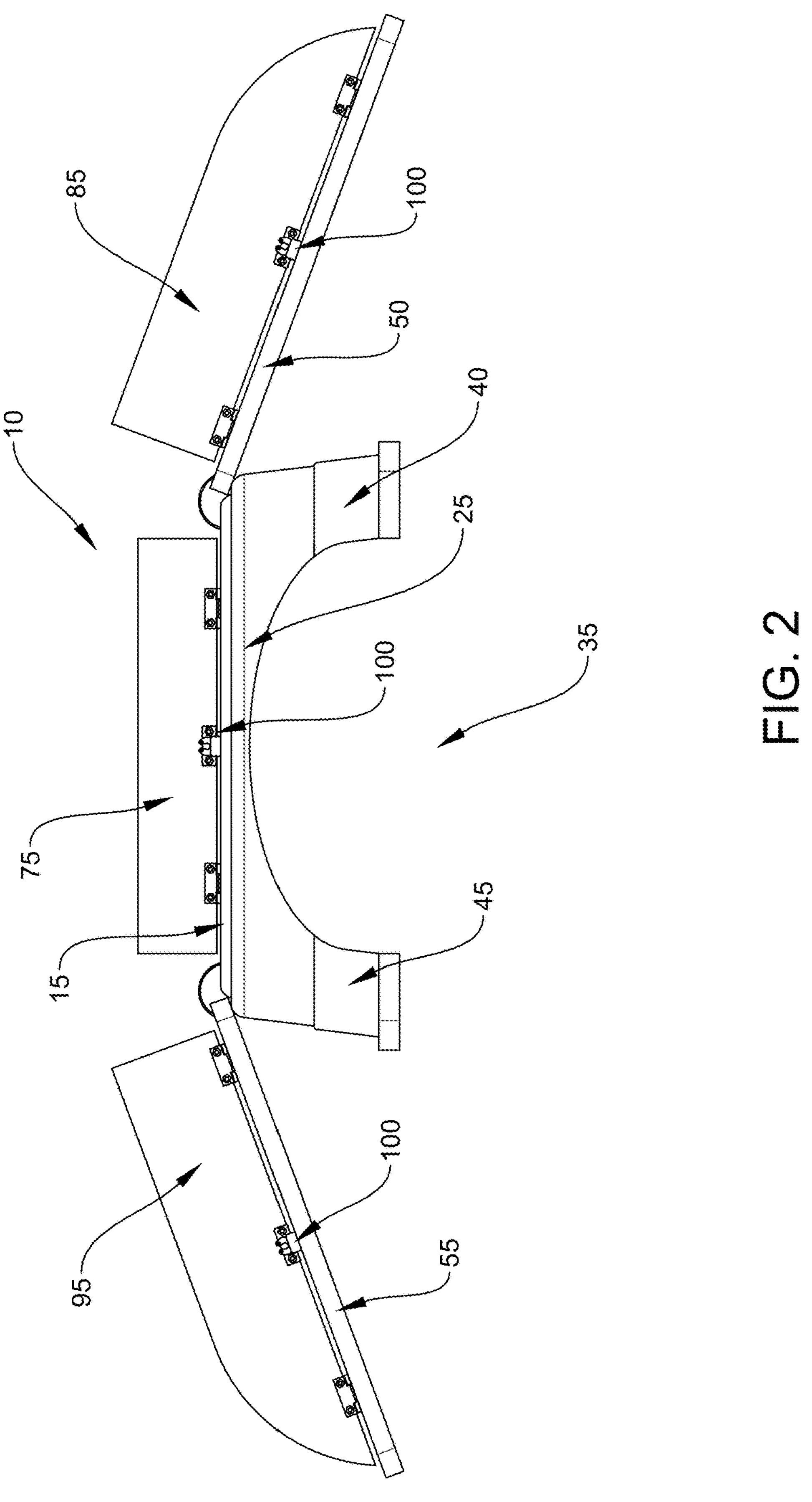
FIG. 2 shows a front view of an example collapsible ramp in its extended state in accordance with an embodiment of the disclosure.

With reference to the embodiment depicted in FIGS. 1 and 2, a perspective and top view of the example collapsible ramp 10 is viewed. The example collapsible ramp 10 may include a bridge 15 and a plurality of ramps 20. The plurality of ramps 20 may be affixed to the bridge 15.

The bridge 15 may include a top surface 25, a plurality of bridge legs 30, and an opening 35. The plurality of bridge legs 30 may be viewed as extending from the termination ends of the bridge top surface 25. The plurality of bridge legs 30 may be positioned normal, or in an approximate ninety-degree alignment from, the bridge top surface 25 along a horizontal plane. Other positional alignments between the plurality of bridge legs 30 and the bridge top surface 25 are possible and envisioned by the inventor.

As shown in FIG. 1, the bridge top surface 25 may have a generally rectangular shape. It is alternatively envisioned that the bridge top surface 25 be circular, square, pentagonal, hexagonal, heptagonal, octagonal, nonagonal, decagonal, and various other shapes including irregular shapes. FIGS. 1 and 2 further show a first bridge leg 40 and a second bridge leg 45. While the views illustrated in FIGS. 1 and 2 show two bridge legs of the plurality of bridge legs 30, it should be understood that additional bridge legs may be employed. The bridge top surface 25 and plurality of bridge legs 30 may be formed of a single piece of material by way of injection molding, material printing, or extrusion of the desired material. Alternatively, the bridge top surface 25 and plurality of bridge legs 30 may be distinct and separate components that can be affixed together. In the exemplary embodiment, the bridge top surface 25 and plurality of bridge legs 30 can be made of a type of plastic, but it should be understood that the bridge top surface 25 and plurality of bridge legs 30 can be made of any material sufficient to withstand the forces resulting from use of the bridge 15 including metals, metallic alloys, polymers, wood, or any other suitable material or combinations thereof. It is anticipated that the primary forces will be the weight of the object, person, or animal using the bridge 15 and the weight of the rest of the collapsible ramp 10 when in a collapsed position. The bridge opening 35 may be defined as the are under the bridge top surface 25 and between any two of the plurality of bridge legs 30. While the views illustrated in FIGS. 1 and 2 only show one opening 35, it is envisioned that multiple openings 35 may exist commensurate with the number of bridge legs 30.

FIGS. 1 and 2 illustrate a first ramp 50 and a second ramp 55. While the views illustrated in FIGS. 1 and 2 show two ramps of the plurality of ramps 20, it should be understood that different numbers of ramps may be employed including only a singular ramp or additional ramps. In the exemplary embodiment, the plurality of ramps 20 can be made of a type of plastic, but it should be understood that the plurality of ramps 20 can be made of any material sufficient to withstand the forces resulting from use of the ramp including metals, metallic alloys, polymers, wood, or any other suitable material or combinations thereof. It is anticipated that the primary force will be the weight of the object, person, or animal using the ramp. As depicted by FIGS. 1 and 2, the first and second ramps 50 and 55 are substantially the same size and shape. Specifically, the first and second ramps 50 and 55 are a generally rectangular prism. However, it should be understood that different designs and shapes are possible and envisioned including the ramps being a generally right triangular prism, a half square based pyramid, an inverted half square based pyramid, or any other shape, including irregularly shapes, sufficient to create a ramp from the bridge 15 to a surface the collapsible ramp 10 sits on. Additionally, each of the plurality of ramps 20 may be different shapes and sizes. For example, one ramp may be longer than the other ramps of the plurality of ramps 20, or one ramp be a generally right triangular prism while the other ramps of the plurality of ramps 20 are shaped as generally rectangular prisms. Further, each of the plurality of ramps 20 may have two or more pieces hinged together allowing the plurality of ramps 20 to fold on top of itself.

The plurality of ramps 20 may be angled at an angle below a horizontal plane. In one embodiment, the plurality of ramps 20 are angled between 0 and 45 degrees below a horizontal plane. In the exemplary embodiment, the plurality of ramps 20 are angled between 30 and 35 degrees below a horizontal plane. However, it is envisioned that various ramps of the plurality of ramps 20 may be set at an angle different than other ramps of the plurality of ramps 20.

The collapsible ramp 10 may include a plurality of bridge side walls 60 and a plurality of ramp side walls 65. The plurality of bridge side walls 60 may be affixed to the bridge 15. The plurality of ramp side walls 65 may be affixed to the plurality of ramps 20.

As shown in FIGS. 1 and 2, the plurality of bridge side walls 60 may include a first bridge side wall 70 and a second bridge side wall 75. While the views illustrated in FIGS. 1 and 2 show two bridge side walls of the plurality of bridge side walls 60, it should be understood that different numbers of bridge side walls may be employed including fewer or additional bridge side walls. It should also be understood that the plurality of bridge side walls 60 may be different shapes and sizes from that depicted in FIGS. 1 and 2 and individual bridge side walls may be different shapes and sizes than the other bridge side walls. FIGS. 1 and 2 further show that the plurality of ramp side walls 65 may include a first ramp side wall 80, a second ramp side wall 85, a third ramp side wall 90, and a fourth ramp side wall 95. While the views illustrated in FIGS. 1 and 2 show four ramp side walls of the plurality of ramp side walls 65, it should be understood that different numbers of ramp side walls may be employed including fewer or additional ramp side walls. It should also be understood that the plurality of ramp side walls 65 may be different shapes and sizes from that depicted in FIGS. 1 and 2 and the individual ramp side walls may be different shapes and sized than the other ramp side walls. In the exemplary embodiment, the plurality of bridge side walls 60 and plurality of ramp side walls 65 can be made of a type of plastic, but it should be understood that the plurality of bridge side walls 60 and plurality of ramp side walls 65 can be made of any material sufficient to maintain the object, person, or animal using the ramp 20 or bridge 15 on the ramp 20 or bridge 15, including metals, metallic alloys, polymers, wood, or any other suitable material or combinations thereof.

The plurality of bridge side walls 60 may have a plurality of positions, including a first position and a second position. The first position may be a collapsed position where the plurality of bridge side walls 60 lay against the bridge 15. This can be seen in FIG. 3 where the first bridge side wall and the second bridge side wall 70' and 75' are in the collapsed position. The second position may be an extended position where the plurality of bridge side walls 60 are in a generally upright position. This can be seen in FIGS. 1 and 2 where the first bridge side wall and the second bridge side wall 70 and 75 are in the generally upright position.

Figure 3:
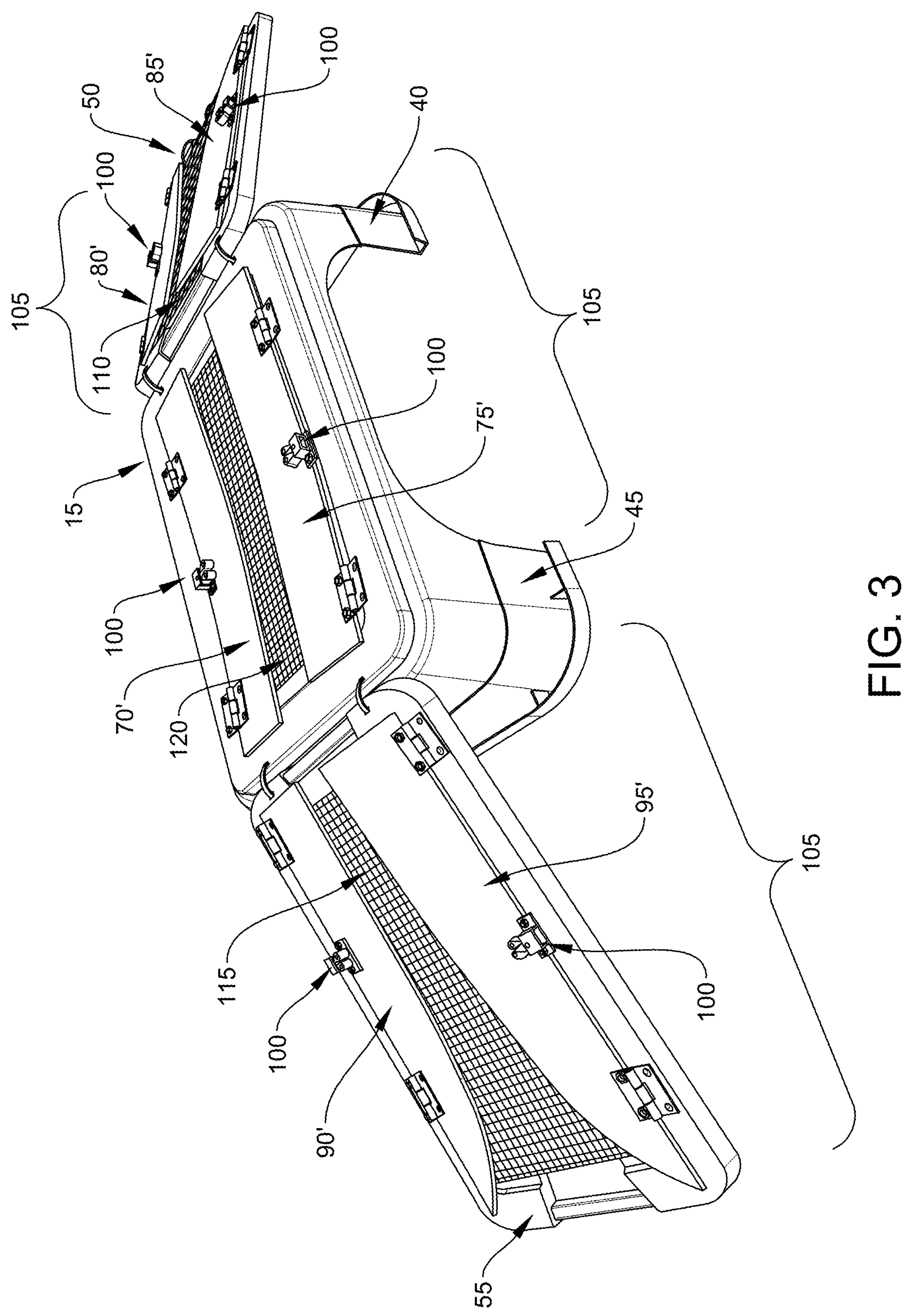
FIG. 3 shows a perspective view of an example collapsible ramp in its partially collapsed state in accordance with an embodiment of the disclosure.

The plurality of ramp side walls 65 may also have a plurality of positions, including a first position and a second position. The first position may be a collapsed position where the ramp side walls 65 lay against the plurality of ramps 20. This is shown in FIG. 3 where the first ramp side wall 80', second ramp side wall 85', third ramp side wall 90', and fourth ramp side wall 95' are in the collapsed position. The second position may be an extended position where the plurality of ramp side walls 65 are in a generally upright position. This is shown in FIGS. 1 and 2 where the first ramp side wall 80, second ramp side wall 85, third ramp side wall 90, and fourth ramp side wall 95 are in the generally upright position.

Figure 4:
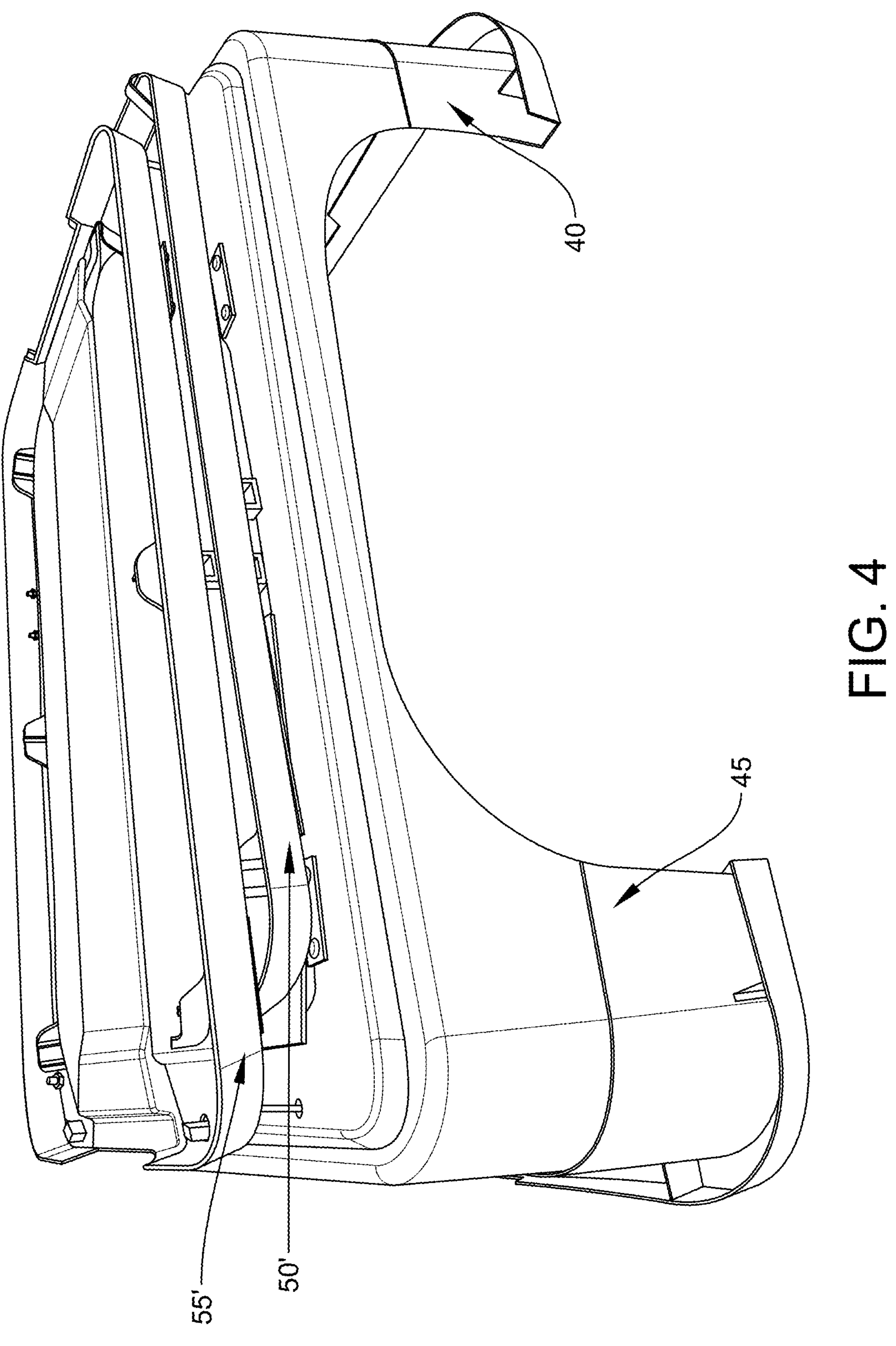
FIG. 4 shows a perspective view of an example collapsible ramp in its collapsed state in accordance with an embodiment of the disclosure.

The plurality of ramps 20 may similarly have a plurality of positions, including a first position and a second position. The first position may be a collapsed position where the plurality of ramps 20 are folded onto the bridge 15. This is depicted in FIG. 4 where the first ramp 50' and the second ramp 55' are folded onto the bridge 15. The second position may be an extended position where the plurality of ramps 20 extend from the bridge 15 to a surface the collapsible ramp 10 sits on. This is depicted in FIG. 3 where the first ramp 50 and the second ramp 55 extend from the bridge 15 to the surface the collapsible ramp 10 sits on.

The plurality of bridge legs 30 may also have a plurality of positions, including a first position and a second position. The first position may be a collapsed position where the plurality bridge legs 30 fold inward such that they lay parallel to the bridge top surface 25 and are substantially adjacent to the bridge top surface 25 (not viewed). The second position may be an extended position where the plurality bridge legs 30 extend from the bridge top surface 25 in an approximate ninety-degree alignment from, the bridge top surface 25 along a horizontal plane, as shown in FIGS. 1 through 4.

As seen in FIGS. 1-3, the collapsible ramp may further include a plurality of latches 100. The plurality of latches 100 may be attached to the bridge 15 and the plurality of bridge side walls 60. The plurality of latches 100 may also be attached to the plurality of ramps 20 and the plurality of ramp side walls 65. The plurality of latches 100 may be used to latch the plurality of bridge side walls 60 in the second, extended position. The plurality of latches 100 may also be used to latch the plurality of ramp side walls 60 in the second, extended position.

Figure 5:
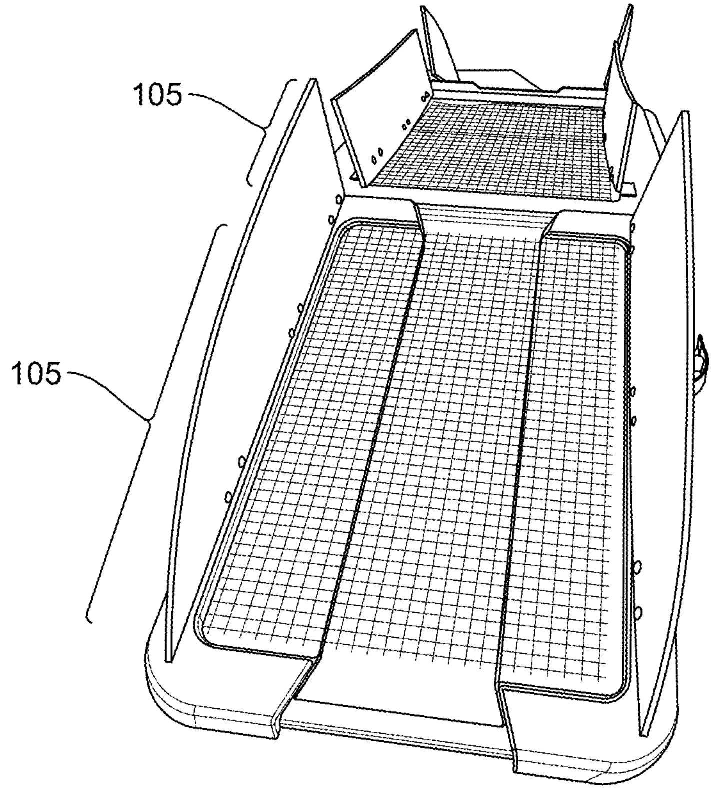
FIG. 5 shows a perspective view of a first ramp of the collapsible ramp in accordance with an embodiment of the disclosure.

The collapsible ramp 10 may also include a plurality of gripping materials 105. This plurality of gripping materials 105 may be coupled to the bridge 15. The plurality of gripping materials 105 may also be coupled to the plurality of ramps 20. In the exemplary embodiment, the collapsible ramp 10 includes a first gripping material 110 coupled to the first ramp 50, a second gripping material 115 coupled to the second ramp 55, and a third gripping material 120 coupled to the bridge 15, as shown by FIG. 3. In the exemplary embodiment, as shown in FIG. 5, the plurality of gripping materials 105 is perforated in order to more securely engage with the object, person, or animal using the collapsible ramp 10. However, it is envisioned that the plurality of gripping materials 105 may be textured, such as with a plurality of ridges and/or a plurality of depressions. It is also envisioned that the plurality of gripping materials 105 may be of a material with a higher frictional coefficient when contacting the object, person, or animal using the collapsible ramp 10 than the material used for the bridge 15 and the plurality of ramps 20.

Figure 6:
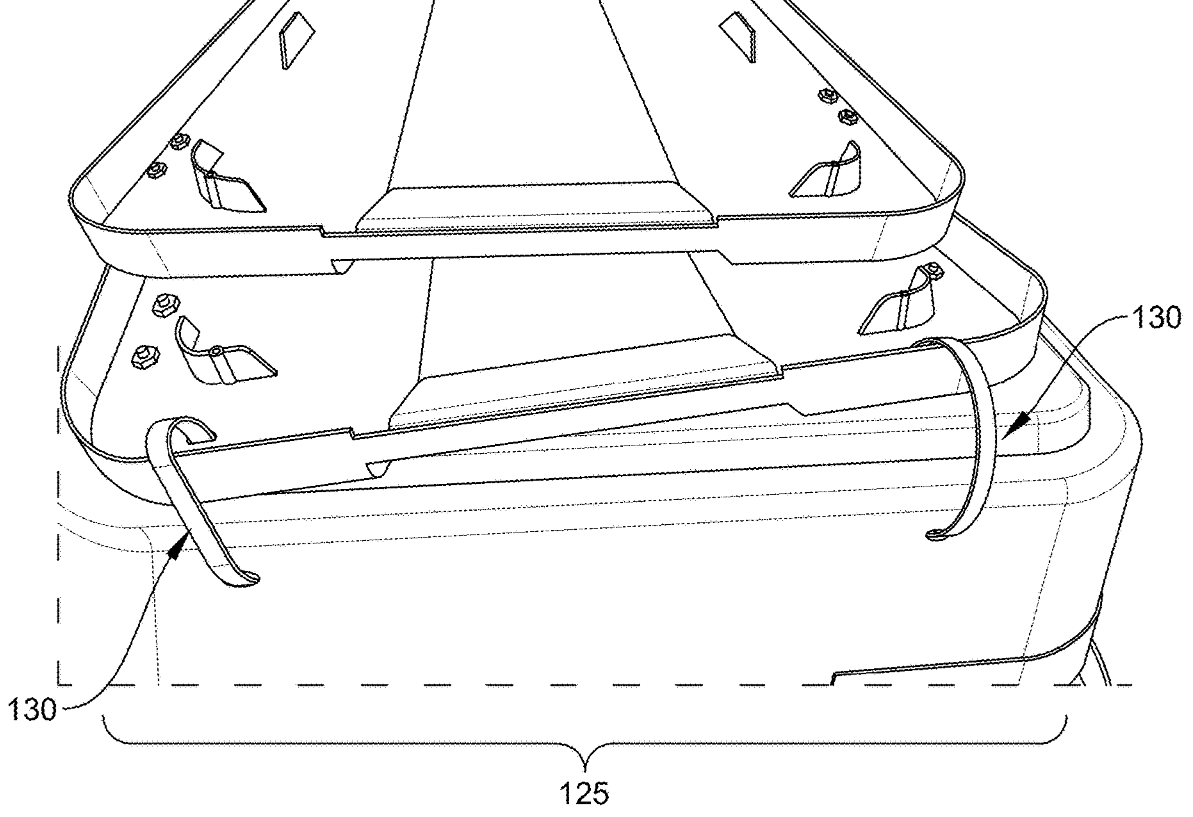
FIG. 6 shows a perspective view of an example collapsible ramp in its collapsed state in accordance with an embodiment of the disclosure.
Figure 7:
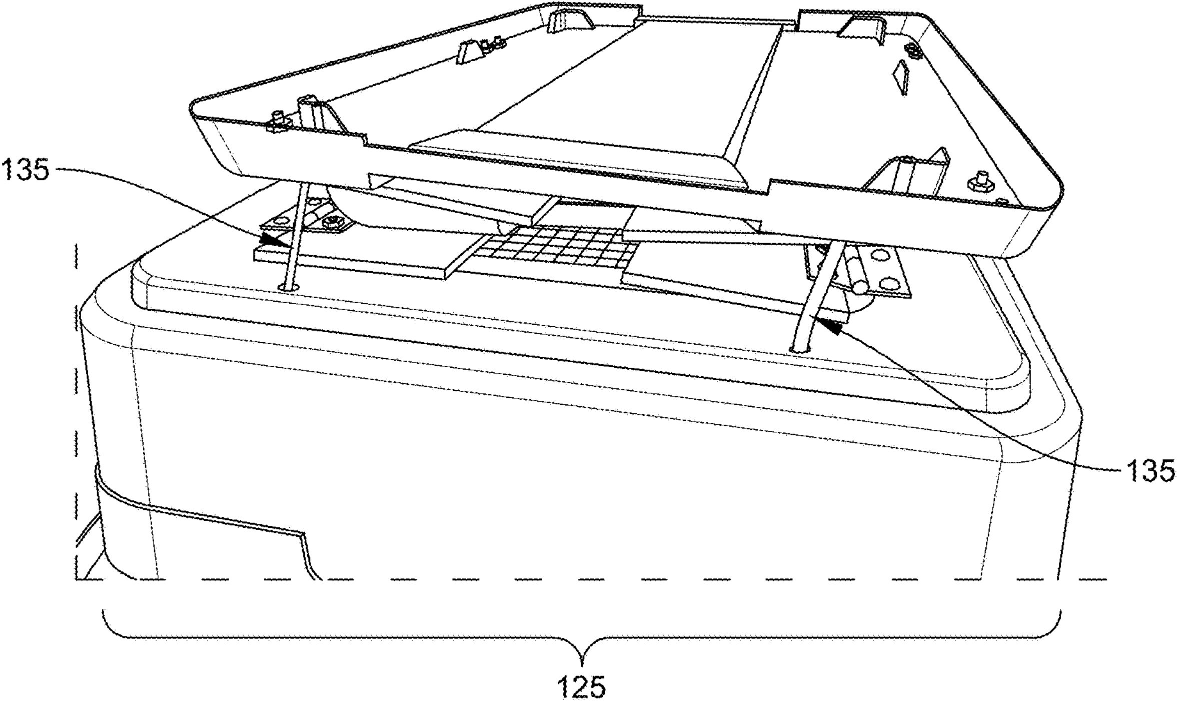
FIG. 7 shows a perspective view of an example collapsible ramp in its collapsed state in accordance with an embodiment of the disclosure.

As previously described, the plurality of ramps 20 may be affixed to the bridge 15. In the exemplary embodiment, as shown by FIGS. 6 and 7, the plurality of ramps 20 are affixed to the bridge 15 by a plurality of hinges 125. Specifically, the first ramp 50 is affixed to the bridge 15 with a circular hinge 130 and the second ramp 55 is affixed to the bridge 15 with a straight hinge 135. It should be understood that the plurality of hinges 125 may be the same type, such as both being circular, but different sizes or that they may be the same type and size of hinge. It should also be understood that the plurality of hinges 125 may be of any type of hinge to allow the plurality of ramps 20 to be movable between the first position and the second position, such as a butt hinge, a ball bearing hinge, a concealed hinge, or an overlay hinge.

Figure 8:
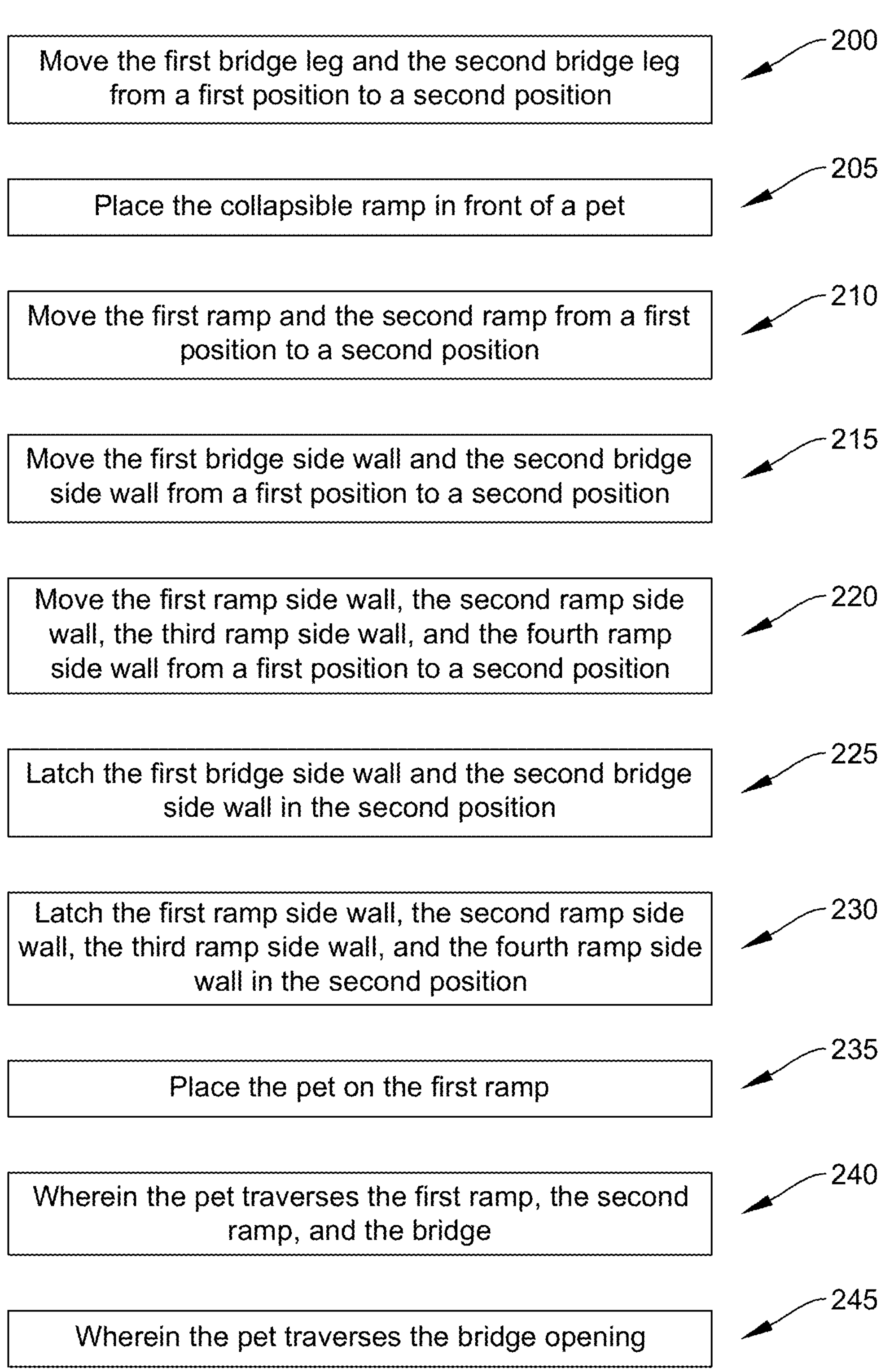
FIG. 8 illustrates a flowchart for assembling the example collapsible ramp in accordance with an embodiment of the disclosure.

Turning now to FIG. 8, a flowchart is viewed illustrating the operative steps that may be possible and completed by an end user to place the collapsible ramp 10 from a first, collapsed position to a second, extended position. Once in the second, extended position, the collapsible ramp 10 is ready for use. The flowchart of FIG. 8 further illustrates use of the collapsible ramp 10 by an end sure to exercise their pet. To begin the operational use process, and viewed in block 200, the end user may first move the first bridge leg 40 from a first position to a second position and the second bridge leg 45 from a first position to a second position. Then, in block 205, the user may place the collapsible ramp 10 in front of a pet. Next, in block 210, the user may move the first ramp 50 from a first position to a second position and the second ramp 55 from a first position to a second position. Then, in block 215, the user may move the first bridge side wall 70 from a first position to a second position and the second bridge wall 75 from a first position to a second position. Subsequently, in block 220, the user may move the first ramp side wall 80 from a first position to a second position, the second ramp side wall 85 from a first position to a second position, the third ramp side wall 90 from a first position to a second position, and the fourth ramp side wall 95 from a first position to a second position. Then, in block 225, the user may latch the first bridge side wall 70 in the second position and the second bridge side wall 75 in the second position. Next, in block 230, the user may latch the first ramp side wall 80 in the second position, the second ramp side wall 85 in the second position, the third ramp side wall 90 in the second position, and the fourth ramp side wall 95 in the second position. Then, in block 235, the user may place the pet on the first ramp 50, wherein the pet traverses the first ramp 50, the second ramp 55, and the bridge 15 in block 240. Lastly, in block 245, wherein the pet traverses the bridge opening 35.

Figure 9:
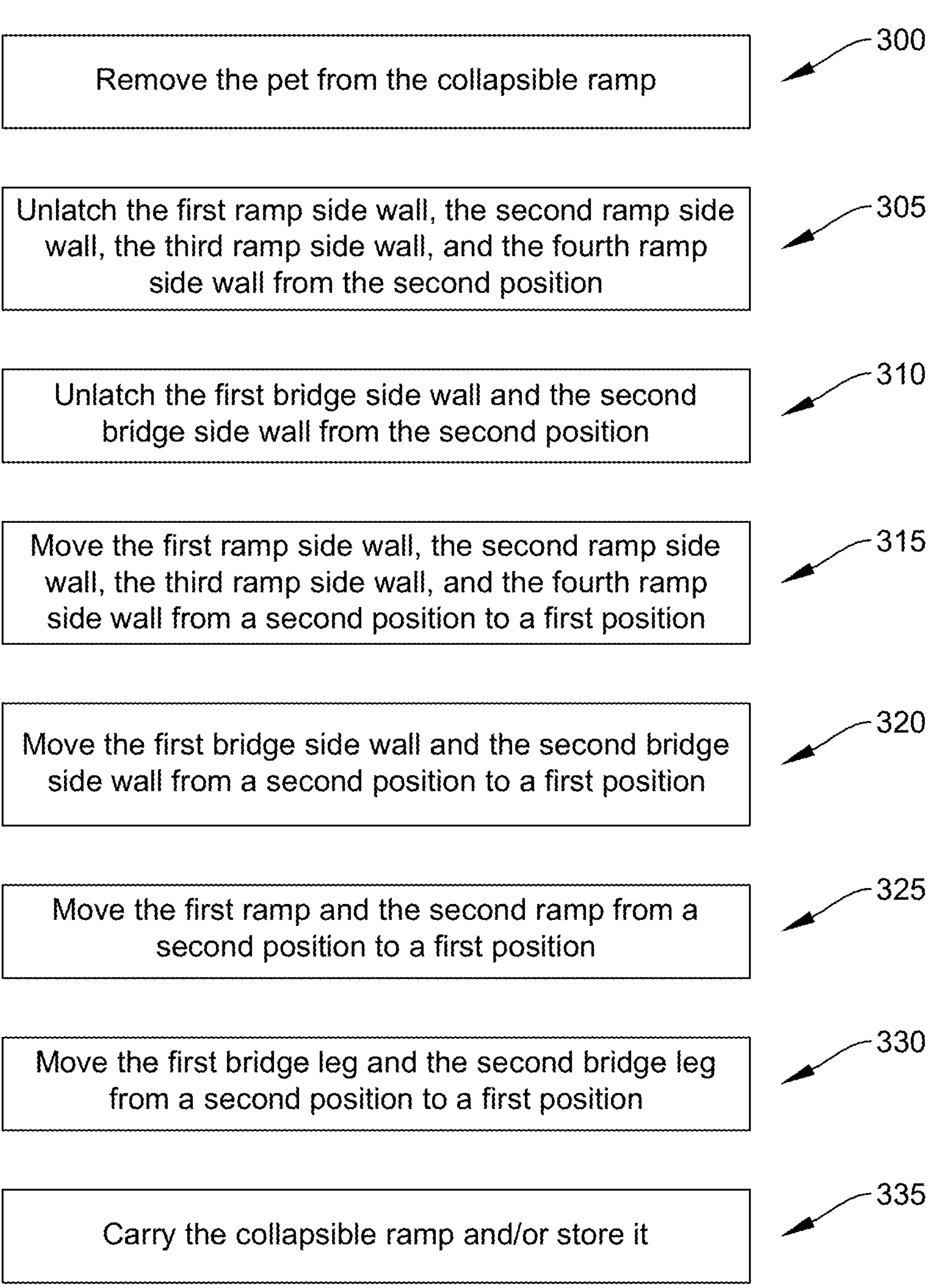
FIG. 9 illustrates a flowchart for disassembling the example collapsible ramp in accordance with an embodiment of the disclosure.

In FIG. 9, a flowchart is viewed illustrating the operative steps that may be possible and completed by an end user to place the collapsible ramp 10 from a second, extended position to a first, collapsed position. Once in the first, collapsed position, the collapsible ramp 10 can be carried or stored easily. The operational flowchart of FIG. 9 begins at step 300 where the end user may remove the pet from the collapsible ramp. Next, in block 305, the user may unlatch the first ramp side wall 80 from the second position, the second ramp side wall 85 from the second position, the third ramp side wall 90 from the second position, and the fourth ramp side wall 95 from the second position. Then, in block 310, the user may unlatch the first bridge side wall 70 from the second position and the second bridge side wall 75 from the second position. Later, in block 315, the user may move the first ramp side wall 80 from a second position to a first position, the second ramp side wall 80 from a second position to a first position, the third ramp side wall 80 from a second position to a first position, and the fourth ramp side wall 80 from a second position to a first position. Subsequently, in block 320, the user may move the first bridge side wall 70 from a second position to a first position and the second bridge wall 75 from a second position to a first position. Then, in block 325, the user may move the first ramp 50 from a second position to a first position and the second ramp 55 from a second position to a first position. Next, in block 330, the user may move the first bridge leg 40 from a second position to a first position and the second bridge leg 45 from a second position to a first position. Lastly, in block 335, the user may easily carry the collapsible ramp 10 and/or easily store it.

What is claimed is:

1. A collapsible ramp comprising:

a bridge having a top surface;

a first bridge side wall operatively hingedly connected to the bridge;

a second bridge side wall operatively hingedly connected to the bridge;

a first ramp operatively hingedly connected to the bridge, the first ramp having a top surface;

a first ramp side wall operatively hingedly connected to the first ramp;

a second ramp side wall operatively hingedly connected to the first ramp;

a second ramp operatively hingedly connected to the bridge, the second ramp having a top surface;

a third ramp side wall operatively hingedly connected to the second ramp;

a fourth ramp side wall operatively hingedly connected to the second ramp;

wherein the first bridge side wall is movable between a first position in which the first bridge side wall is folded over the top surface of the bridge and a second position in which the first bridge side wall extends away from the top surface of the bridge;

wherein the second bridge side wall is movable between a first position in which the second bridge side wall is folded over the top surface of the bridge and a second position in which the second bridge side wall extends away from the top surface of the bridge;

wherein the first ramp side wall is movable between a first position in which the first ramp side wall is folded over from the top surface of the first ramp and a second position in which the first ramp side wall extends away from the top surface of the first ramp;

wherein the second ramp side wall is movable between a first position in which the second ramp side wall is folded over the top surface of the first ramp and a second position in which the second ramp side wall extends away from the top surface of the first ramp;

wherein the third ramp side wall is movable between a first position in which the third ramp side wall is folded over the top surface of the second ramp and a second position in which the third ramp side wall extends away from the top surface of the second ramp; and wherein the fourth ramp side wall is movable between a first position in which the fourth ramp side wall is folded over the top surface of the second ramp and a second position in which the fourth ramp side wall extends away from the top surface of the second ramp;

wherein the first ramp is movable between a first position and a second position, wherein in the first position, the first ramp is folded over the bridge, and wherein in the second position, the first ramp extends away from the bridge; and wherein the second ramp is movable between a first position and a second position, wherein in the first position, the second ramp is folded over the bridge, and wherein in the second position, the second ramp extends away from the bridge;

wherein the collapsible ramp is configurable between an extended configuration and a folded configuration, wherein in the extended configuration, the first ramp, the second ramp, the first ramp side wall, the second ramp side wall, the third ramp side wall, the fourth ramp side wall, the first bridge side wall, and the second bridge side wall are each in their respective second positions, and wherein the folded configuration, the first ramp, the second ramp, the first ramp side wall, the second ramp side wall, the third ramp side wall, the fourth ramp side wall, the first bridge side wall, and the second bridge side wall are each in their respective first positions with the first ramp folded over the second ramp.

2. The collapsible ramp of claim 1, wherein the first ramp is angled between 0 and 45 degrees below a horizontal plane.

3. The collapsible ramp of claim 1 wherein the first ramp is operatively hingedly connected to the bridge with a circular hinge, and the second ramp is operatively hingedly connected to the bridge with a straight hinge.

4. The collapsible ramp of claim 1, the collapsible ramp further comprising:

a first gripping material coupled to the first ramp;

a second gripping material coupled to the second ramp; and a third gripping material coupled to the bridge.

5. The collapsible ramp of claim 4, wherein the first gripping material has a plurality of openings;

wherein the second gripping material has a plurality of openings; and wherein the third gripping material has a plurality of openings.

6. The collapsible ramp of claim 4, wherein the first gripping material has a higher frictional coefficient when contacting an object using the collapsible ramp than the first ramp;

wherein the second gripping material has a higher frictional coefficient when contacting the object using the collapsible ramp than the second ramp; and wherein the third gripping material has a higher frictional coefficient when contacting the object using the collapsible ramp than the bridge.

7. The collapsible ramp of claim 1, wherein the bridge has a first leg and a second leg.

8. The collapsible ramp of claim 7, the collapsible ramp further comprising an opening under the bridge and between the first leg of the bridge and the second leg of the bridge.

9. The collapsible ramp of claim 1, the collapsible ramp further comprising:

a plurality of latches; and wherein the plurality of latches are operatively connected to the bridge, the first ramp, and the second ramp.

10. The collapsible ramp of claim 9, wherein the first bridge side wall latches into the second position;

wherein the second bridge side wall latches into the second position;

wherein the first ramp side wall latches into the second position;

wherein the second ramp side wall latches into the second position;

wherein the third ramp side wall latches into the second position; and wherein the fourth ramp side wall latches into the second position.

11. A method of exercising a pet comprising:

placing a collapsible ramp in front of the pet wherein the collapsible ramp comprises:

a bridge having a top surface;

a first bridge side wall operatively hingedly connected to the bridge;

a second bridge side wall operatively hingedly connected to the bridge;

a first ramp operatively hingedly connected to the bridge, the first ramp having a top surface;

a first ramp side wall operatively hingedly connected to the first ramp;

a second ramp side wall operatively hingedly connected to the first ramp;

a second ramp operatively hingedly connected to the bridge, the second ramp having a top surface;

a third ramp side wall operatively hingedly connected to the second ramp;

a fourth ramp side wall operatively hingedly connected to the second ramp;

moving the collapsible ramp to an extended configuration by:

(a) moving the first ramp from a first position in which the first ramp is folded over the bridge with the first ramp folded over the second ramp to a second position in which the first ramp extends away from the bridge;

(b) moving the second ramp from a first position in which the second ramp is folder over the bridge to a second position in which the second ramp extends away from the bridge;

(c) moving the first bridge side wall from a first position in which the first bridge side wall is folded over the top surface of the bridge to a second position in which the first bridge side wall extends away from the top surface of the bridge;

(d) moving the second bridge side wall from a first position in which the second bridge side wall is folded over the top surface of the bridge to a second position which the second bridge side wall extends away from the top surface of the bridge;

(e) moving the first ramp side wall from a first position in which the first ramp side wall is folded over from the top surface of the first ramp and a second position in which the first ramp side wall extends away from the top surface of the first ramp;

(f) moving the second ramp side wall from a first position in which the second ramp side wall is folded over the top surface of the first ramp and a second position in which the second ramp side wall extends away from the top surface of the first ramp;

(g) moving the third ramp side wall from a first position in which the third ramp side wall is folded over the top surface of the second ramp to a second position in which the third ramp side wall is extends away from the top surface of the second ramp;

(h) moving the fourth ramp side wall from a first position in which the fourth ramp side wall is folded over the top surface of the second ramp to a second position in which the fourth ramp side wall extends away from the top surface of the second ramp;

placing the pet on the first ramp; and wherein the pet traverses the first ramp, the second ramp, and the bridge.

12. The method of claim 11 further comprising:

removing the pet from the collapsible ramp; and moving the collapsible ramp to a folded configuration by:

(i) moving the first bridge side wall from the second position to the first position;

(j) moving the second bridge side wall from the second position to the first position;

(k) moving the first ramp side wall from the second position to the first position;

(l) moving the second ramp side wall from the second position to the first position;

(m) moving the third ramp side wall from the second position to the first position;

(n) moving the fourth ramp side wall from the second position to the first position;

(o) moving the second ramp from the second position to the first position; and (p) moving the first ramp from the second position to the first position with the first ramp folded over the second ramp.

13. The method of claim 11, wherein the pet further traverses an opening under the bridge and between a first leg of the bridge and a second leg of the bridge.

14. The method of claim 13, wherein;

the step of moving the first bridge side wall to the second position further includes latching the first bridge side wall in the second position;

the step of moving the second bridge side wall to the second position further includes latching the second bridge side wall in the second position;

the step of moving the first ramp side wall to the second position further includes latching the first ramp side wall in the second position;

the step of moving the second ramp side wall to the second position further includes latching the second ramp side wall in the second position;

the step of moving the third ramp side wall to the second position further includes latching the third ramp side wall in the second position;

the step of moving the fourth ramp side wall to the second position further includes latching the fourth ramp side wall in the second position.

* * * * *